Figure 1:
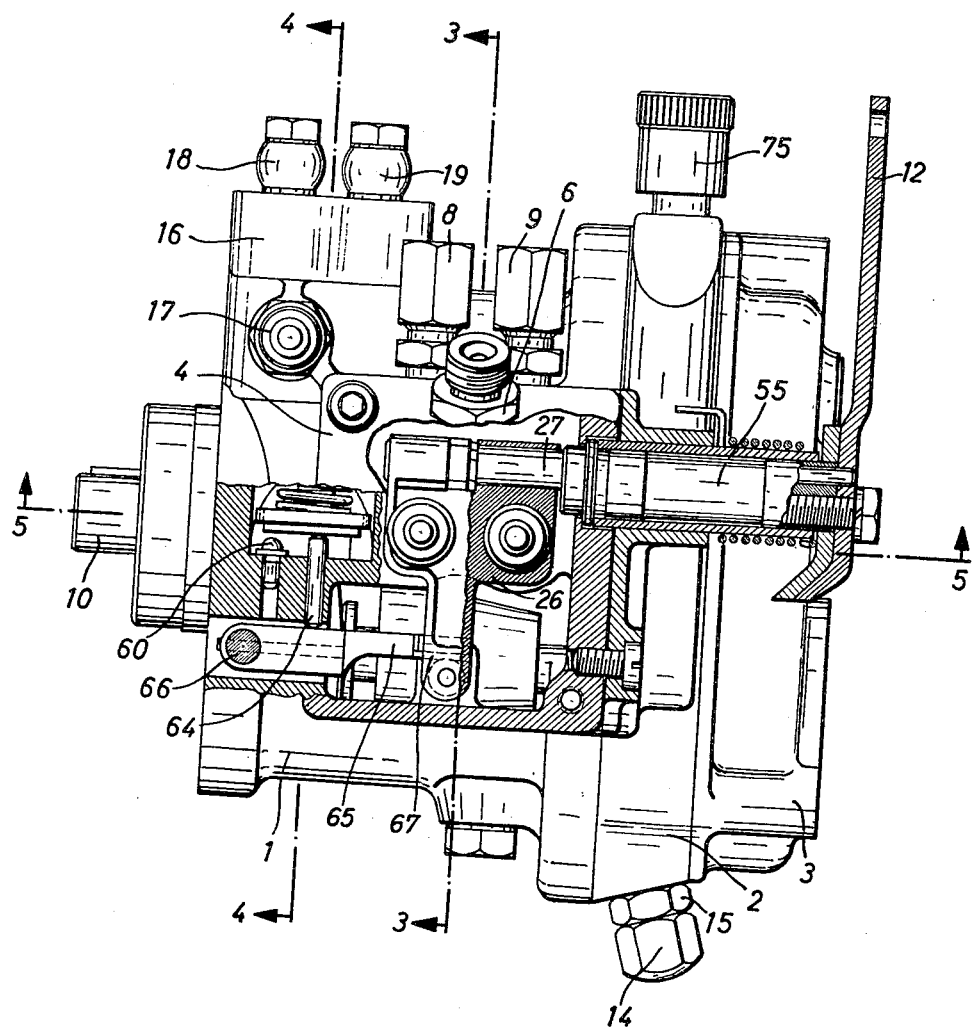

Nov. 7, 1961

W. STAEGE ET AL 3,007,464

FUEL INJECTION PUMPS

Filed Jan. 14, 1958

7 Sheets-Sheet 1

Inventors:
Werner Staege
Rudolf Scherk

By:
Michael S. Striker
Atty

United States Patent Office 3,007,464
Patented Nov. 7, 1961

3,007,464
FUEL INJECTION PUMPS
Werner Staege, Freudenstadt, and Rudolf Schenk, Munich, Germany, assignors to Kugelfischer Georg Schäfer & Co., Schweinfurt, Germany
Filed Jan. 14, 1958, Ser. No. 708,844
Claims priority, application Germany Sept. 19, 1957
3 Claims. (Cl. 123—140)

In fuel injection pumps for internal combustion engines it is known to control the quantity of fuel injected by altering the stroke of a cam-operated injecting piston.

An arrangement has also already been proposed in which the outermost position of the piston at the start of each working stroke is determined by appropriate tilting of a lever linkage. The tilting movements are controlled in accordance with the magnitude of influencing factors which in their turn have a predetermined relationship with the operating conditions of the engine.

Injection pumps of this kind have hitherto, like those also which work on different principles, only been able to reach the market with difficulty, in competition with carburetors, which have existed for decades and have been steadily improved with time. This is chiefly attributable to the substantial difference in price which is in its turn the direct result of the constructive design of the pump. Furthermore, difficulties in applying injection pumps in particular to motor vehicles arose through the fact that in these pumps and especially in their essential moving parts very high standards must be set for their reliability in operation and working life. These requirements are particularly high in pumps for use in petrol engines as their functioning calls for very accurate metering of the quantity of fuel injected.

The foregoing requirements are met, in accordance with the invention, in a fuel injection pump for internal combustion engines of the kind in which control of the quantity of fuel pumped is achieved by altering the stroke of a cam-operated feed piston, the outermost position of the piston at the start of each working stroke being determined by appropriate tilting of a lever linkage. Preferably a three-dimensional curved body effects the angular movement of the lever, and of the lever pivot, the axis of the latter lies on one side of a plane through the axis of the camshaft and the axis of the piston and the axis of the curved body lies on the opposite side of this plane, so that the curved body acts on the piston through a single-armed lever. By this feature not only is an extremely compact layout of the whole pump assembly, including its control device, achieved in one and the same housing, but also there is achieved an arrangement having one of the requirements of accurate yet commercially economical production, namely to incorporate into it a further component, to be described further below, such as a revolution counter or an additional lubricating oil pump with automatic control, the latter for two-stroke engines.

Figure 2:
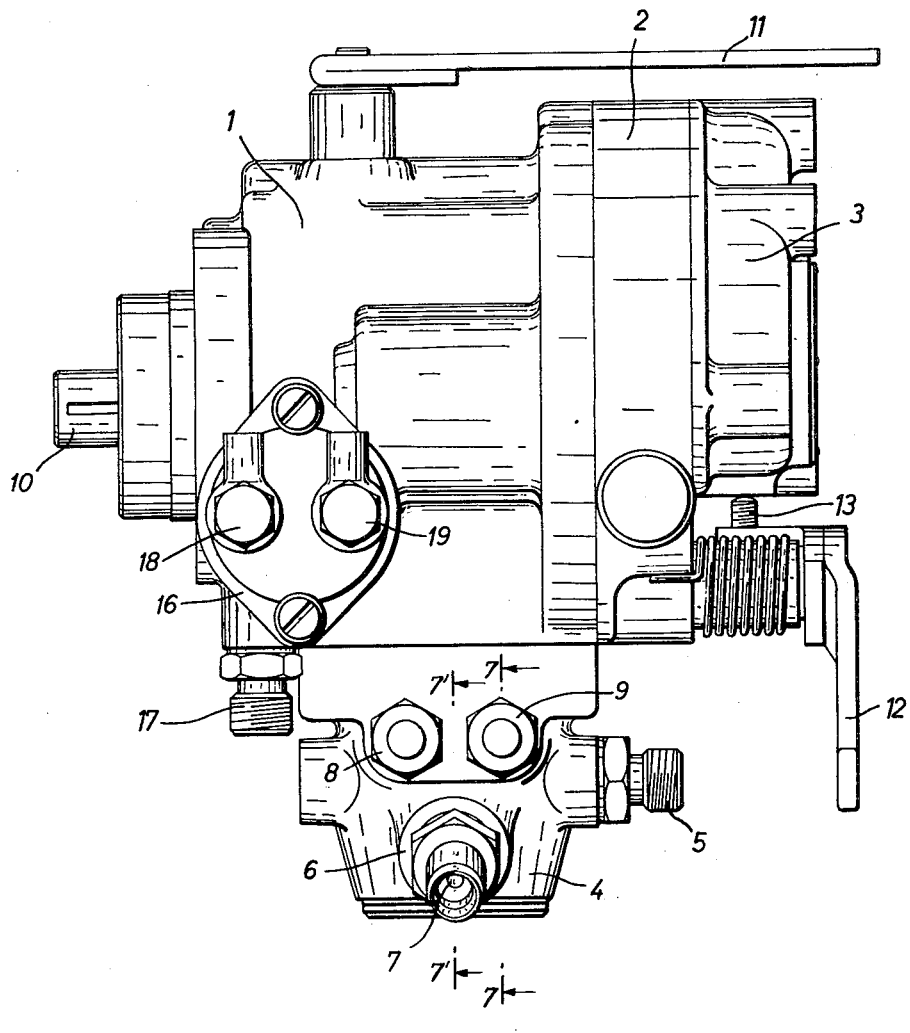
Figure 3:
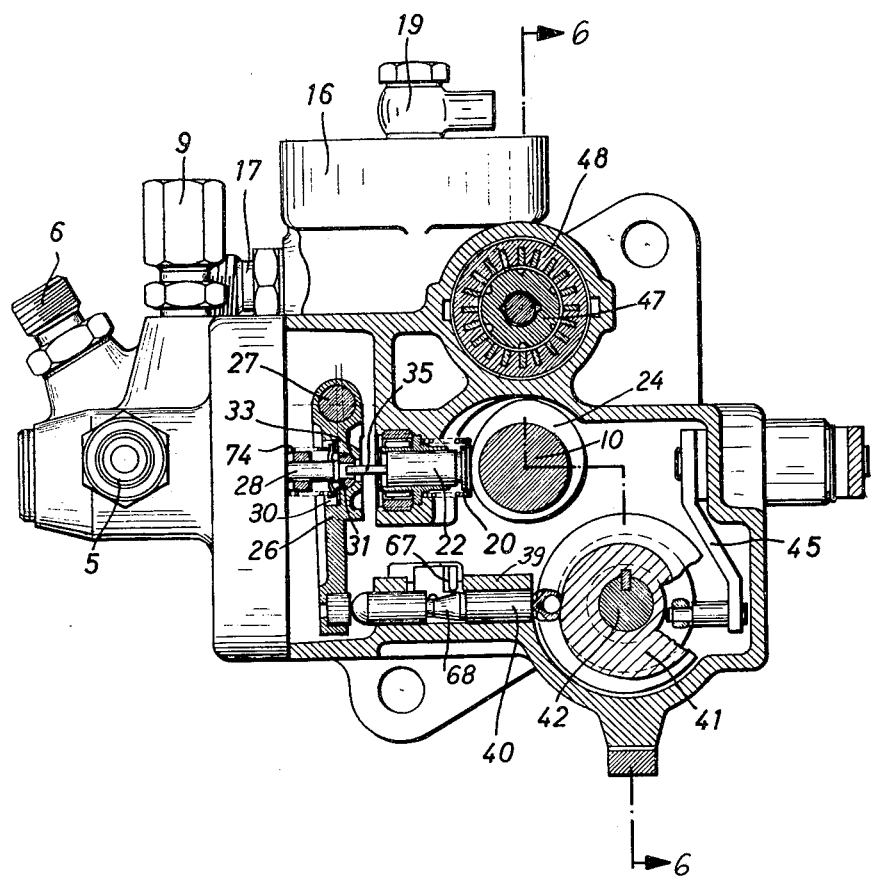
Figure 4:
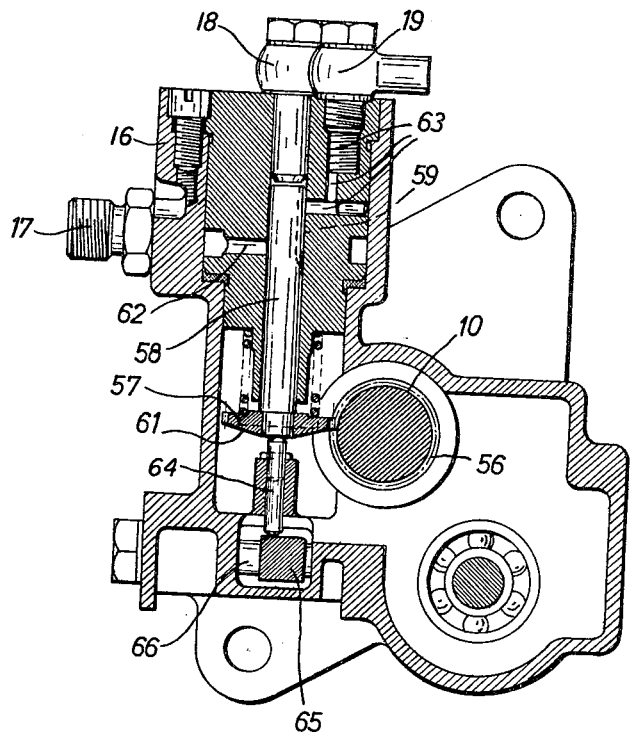
Figure 5:
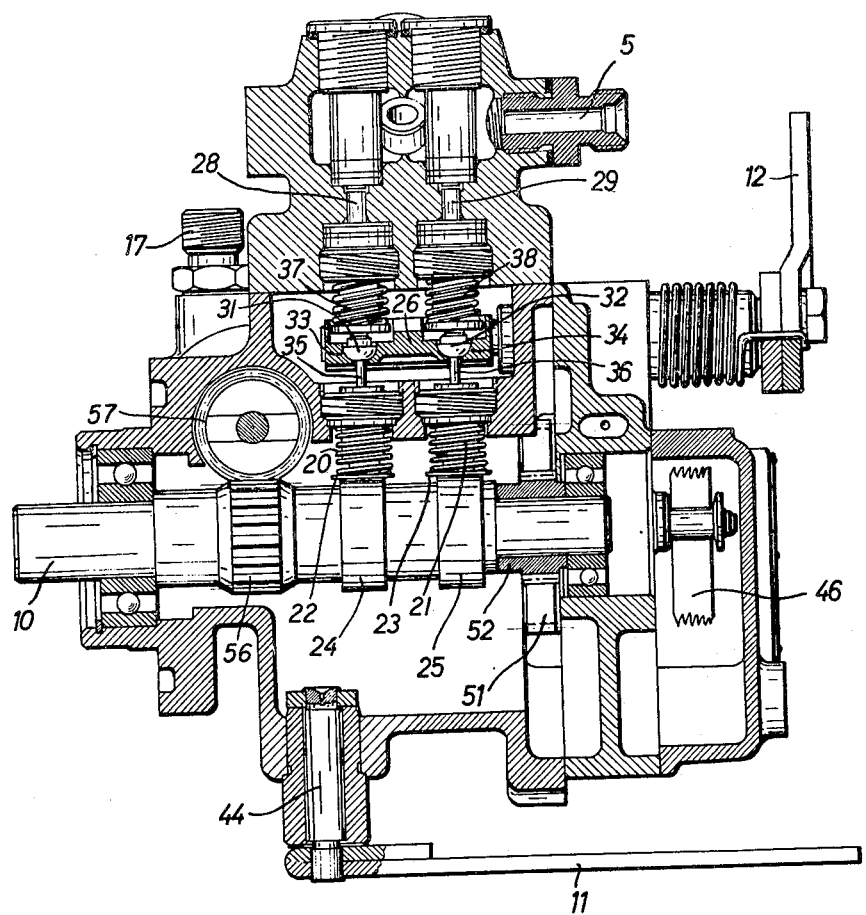
Figure 6:
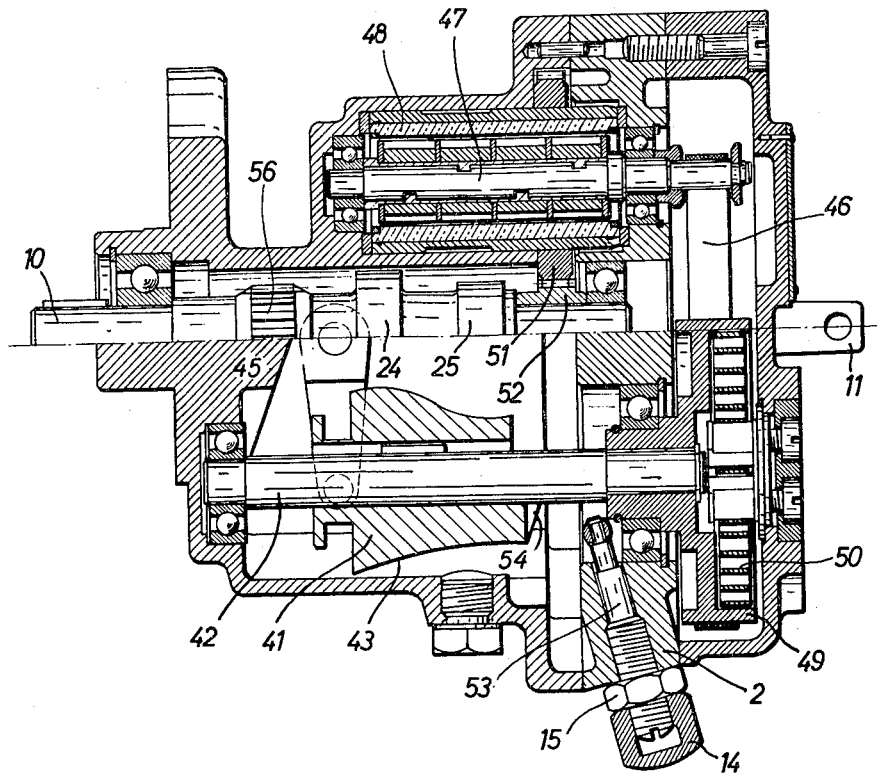
Figure 7:
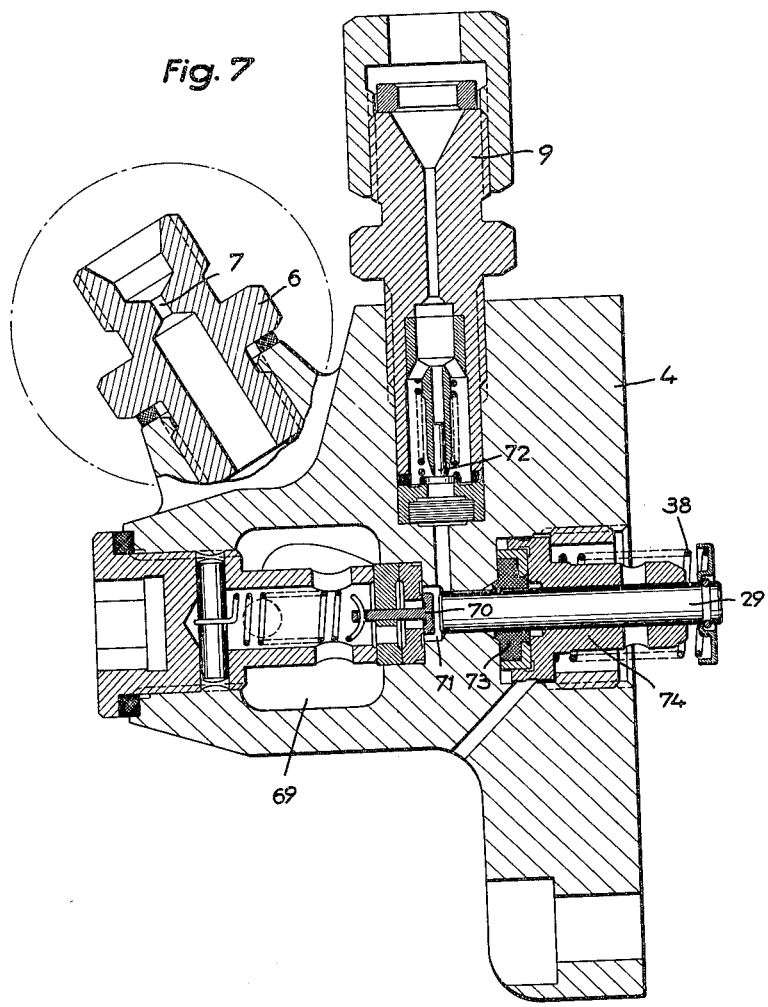

Further features of the invention are set out in the following description, taken in conjunction with the drawings. These show one embodiment, and in them:

FIGURES 1 and 2 show the assembly in partly sectioned front elevation and plan, respectively;

FIGURES 3 and 4 are sectional side elevations, on the lines 3—3 and 4—4 in FIGURE 1 respectively;

FIGURES 5 and 6 are longitudinal sections on the line 5—5 in FIGURE 1 and 6—6 in FIGURES 3 respectively; and FIGURE 7 is a longitudinal section on the line 7—7 in FIGURE 2, showing also a partial section on the line 7'—7'.

Referring to FIGURES 1 and 2 the housing of the injection pump comprises a main member 1, preferably formed as a die casting, an intermediate flange 2, a cover 3, and a flanged pump body 4 (see also FIGURE 7). The fuel is admitted to the housing of the injection pump through a threaded connection 5 on the pump body 4, from a feed pump not shown in the drawings. Any spilled fuel not used for injection into the combustion chambers of the engine emerges from the pump body 4 at a threaded connection 6. This connection 6 is provided with a constriction 7 (see FIGURE 7). This causes a build-up of pressure in the space within the pump body 4 just below the constriction 7. This pressure build-up ensures trouble-free working of the injection pump even at the high engine speeds and high operating temperatures at which it is used. In this connection the arrangement shown in FIGURE 7 will be further described later.

The embodiment shown in FIGURES 1 to 7 is an injection pump especially designed for use with a two-cylinder engine. Accordingly the pump body 4 has two pressure outlet connections 8 and 9, one for each of the two cylinders of the engine.

The injection pump is driven by means of a shaft 10 from the rotating parts of the engine. The shaft 10 is at the same time the camshaft of the injection pump and the driving shaft for a lubricating oil pump, to be described later, connected to and following the injection pump. A control lever 11 is actuated to operate the engine in accordance with the desired quantity of fuel to be pumped, and acts on the injection pump in a manner to be further explained with reference to FIGURES 3 and 6. Also an adjusting lever 12 acts on the mechanism of the injection pump, as will be explained later.

As distinct from the control lever 11, the adjusting lever 12 is provided to cause special additions in the quantity of fuel pumped, to take care of the starting and warming-up periods of the engine and to take account of operation in abnormal conditions of altitude and temperature. The rest position of the lever 12 is fixed by a grub-screw 13 which is pre-set and locked, and which accordingly does not need to be adjusted during operation or servicing of the engine. A cap nut 14 on the intermediate flange 2 fits over the free end of a striking peg, locked by a nut 15, this peg controlling the idling of the engine in a manner to be described later.

An extension 16 built in as a unit with the main body 1 serves to carry the lubricating oil pump mentioned earlier. A device of this kind, to be discussed later in connection with FIGURE 4, is provided for the economical lubrication of the parts of the driving gear, such as the main crankshaft and big-end bearings, and the working surfaces of the cylinders, especially in two-stroke engines. The lubricating oil flows from an intake connection 17 through the interior of the pump to pressure oil outlets 18 and 19, from which it is passed into the engine either directly or with the air for combustion.

In FIGURES 3, 5 and 6 are shown tappets 22 and 23 enclosed in coil springs 20 and 21 and actuated by rotating cams 24 and 25. These tappets 22 and 23 act in their turn on corresponding pump pistons in a manner now to be described:

This action occurs through the medium of a single-armed lever 26 which determines the end positions of pump pistons 28 and 29 at the camshaft ends of their strokes in accordance with its inclination. The corresponding ends of the pistons 28 and 29 are each received in a corresponding recess 30 in the lever 26 at the point at which the edges of the ends of the pistons abut annular faces on bushes 31 and 32, the outer spherically formed faces of which allow the latter to be tilted in all directions in correspondingly formed sockets 33 and 34. Needle-like extensions 35 and 36 of the tappets 22 and 23 pass through bores in these bushes 31 and 32 as soon as the cams 24 and 25 take up their corresponding positions. Return movement of the pistons 28 and 29 into their end positions nearest the camshaft is effected by springs 37 and 38.

The initial position of the one-armed lever 26 is altered if necessary through the medium of a tappet 40 sliding in a guide 39, in accordance with the position of a curved body or three-dimensional cam 41 which can be moved axially and angularly. The curved body 41 is on the one hand rotatable about its axis 42 and on the other hand slidable in the direction of its length. Widely differing points on its curved surface 43 can thus be used to adjust the position of the tappet 40.

The three-dimensional curve forming the surface 43 of the body 41 takes account in its longitudinal direction of a functional relationship with the position of the throttle valve of the engine, and in its rotation it has a relationship with the engine speed. These two controlling factors each thus play their part in determining the height of each point in the surface 43 acting on the tappet 40, and thereby they jointly determine the initial position of the lever 26 and thence the variation in the position of the camshaft end of the stroke of the pump pistons 28 and 29.

Axial movement of the curved body 41 is effected by means of the lever 11 acting through a shaft 44 (see FIGURE 5) and a short arm 45. The rotation of the body 41 is achieved by a driving band 46 (see FIGURE 6), which is actuated by the torque of an inner core 47, which is provided with permanent magnetic poles and can turn angularly within a short-circuited runner 48 formed as an annular rotor, balanced against the opposing torque of an energy-storing device 50 mounted in a spring housing 49, the fixed abutment of the energy-storing device being adjustable. Thus, the housing 49 forms a barrel for the spiral spring 50 which has its outer end adjustably fixed to the cylindrical wall of the barrel 49. In other words the abutment on this cylindrical wall is fixed to the outer end of the spiral spring 50, and the abutment itself can have its location along the cylindrical wall, angularly with respect to the axis of the barrel 49, adjusted for the purpose of increasing or decreasing the tension of the spiral spring 50. The driving band 46 acts on the outer periphery of the spring housing 49. The tachometer or revolution counter formed by the co-operated inner core 47 and short-circuited rotor 48 causes the curved body 41 to be displaced angularly from its initial position by an amount proportional to engine speed, since the short-circuited annular rotor 48 is driven by a spur gear 51 from a spur gear 52 on the camshaft 10.

The curved body 41 is shown in FIGURE 6 in an intermediate position. In its extreme right-hand position (throttle almost closed, i.e., engine idling) a follower 53, which preferably has a ball end, engages an end face 54 of the body 41, this end face being preferably formed as a portion of a helix. By screwing the follower 53 further into or out of the intermediate flange 2 one can, as a consequence of its engagement with the helical end face 54, fix the initial position of the curved body 41 in respect of the factor which controls its axial movement (i.e., the throttle valve position).

Purely to bring about the desired setting of the initial position of the curved body 41 in an axial direction by the inclined arrangement of the axis of the pin 53 it would be sufficient for the end face of the body 41 to be perpendicular to its axis. But this face is made helical so that at very high engine speeds (as with a vehicle on the over-run under conditions where the throttle valve is not operated by the driver, the throttle valve can be caused to close the throttle passage to an extent beyond the normal light running position, by the action of the helical surface, transmitted through the short arm 45. In addition, appropriate shaping of the curve 43 can give, under these driving conditions, such a large angular movement of the lever 26 (FIGURE 3) in a clockwise direction that the fuel is cut off altogether.

The control of the operation of the injection pump by the lever 12 is achieved by transmitting the adjusting movement by means of a shaft 55 to an eccentric pivot pin 27. It has already been stated that this additional control of the quantity of fuel injected is required to provide, for example, for starting and warming-up of the engine, or for operation under abnormal conditions of altitude and temperature, so as to achieve optimum running of the engine.

Referring to FIGURES 4 and 5 the driving of the lubricating oil pump, mounted in the housing 16, from the shaft 10 is effected through a worm 56 and worm-wheel 57. This worm wheel is rigidly secured to the piston 58 of the lubricating oil pump so that this piston rotates about its own axis in accordance with the rotation impressed on the worm wheel 57. Thereby a groove 59 machined in the piston 58 comes more or less into corresponding angular positions with respect to the axis of the piston 58. Moreover, whilst the worm wheel 57 is being rotated, it and the piston 58 connected to it are moved up and down by the engagement of an inclined control face 61 on the worm wheel 57 with the head of a fixed pin 60 (FIG. 1). In this way the lubricating oil entering at the intake 17 is transferred, at the appropriate angular position of the piston 58, by means of a passage 62 and the groove 59 to the interior of the pump cylinder and then forced via passages 63 through the lubricating oil pressure connections 18 and 19 to the interior of the engine.

By means of a control stop 64 the lowermost end position of the wormwheel 57 can be adjusted in accordance with the angular position of a lever 65 turning about a pivot 66. This enables one to control the rate of delivery of the oil, since it results in a corresponding reduction in the stroke of the piston 58. The reduction in stroke is achieved in that the pin 60 only co-operates with a limited portion of the total working face 61. The free end 67 (FIG. 1) of the lever 65 lies against a three-dimensionally curved section 68 (FIG. 3) of the tappet 40 and can, in accordance with movements of this tappet along its axis caused by the curved body 41, cause greater or lesser angular movements of the lever 65. The surface of the section 68 is so formed that the quantity of oil pumped to lubricate the engine is adjusted in accordance with the quantity of fuel injected, being controlled by the same tappet 40. The rest position of the lever 65, i.e., the position of its free end 67 on the section 68 can be moved (by means not shown) in a direction along the length of the section 68. Such an adjustment can also be made in accordance with running conditions, when the conditions under which the engine is operating make necessary a change in the lubricating requirements.

Referring to FIGURE 7 the fuel is drawn by the piston 29 from an intake chamber 69, entry to the space 71 inside the cylinder being controlled by an intake valve 70. On reversal of the piston, and consequent changeover from suction to pressure, the fuel in the space 71 is fed through a delivery valve 72 and pipe connection 9, through further pipe connections (not shown) and ultimately through an injection nozzle (likewise not shown) into the combustion chamber of the engine. The piston 29 is preferably sealed by a resilient seal 73, for which purpose the guide for the piston 29 is formed as a housing 74 for a suitable sliding seating.

The tachometer or revolution counter formed by the inner core 47 and the rotor 48 (FIG. 6) has its axis always parallel to that of the camshaft, in accordance with a feature of the invention, as mentioned earlier. With respect to the axis of the camshaft 10 the revolution counter could be arranged more or less diametrically opposite the axis 42 of the curved body 41. This determination of the position can also be completely executed within the scope of the feature of the invention above, so that the revolution counter can be placed simply anywhere on that side of the plane through the axes of the shaft 10 and the piston 29, opposite to that on which the curved body 41 lies. In this case it must be pointed out that the revolution counter remains disposed above the level of the lubricating oil which must be maintained in the pump housing under operational conditions and which can be replenished when necessary through a filler opening 75 (FIG. 1).

What we claim is:

1. Fuel injection pump for internal combustion engines, in combination, a cam-operated piston, the quantity of fuel injected being controlled by altering the stroke of said cam-operated piston, a lever angularly movable for altering the starting point of the delivery stroke of the piston, a cam shaft, the pivot of said lever being arranged parallel to the axis of the cam shaft on one side of a plane containing the axes of said piston and said camshaft, a three-dimensional cam-shaped curved body for controlling the angular position of said lever arranged on the opposite side of said plane, the axis of said cam-shaped curved body also being parallel to said axis of said camshaft, a speed-sensing device rotating said cam-shaped curved body, said speed-sensing device consisting of a rotor and an internal armature outfitted with permanent magnetic poles, energy-storing means connected to said armature, the torque magnetically imparted to said armature by said rotor acting against said energy-storing means, the cam-shaped curved body being rotated until equilibrium exists between said torque and the force of said energy-storing means, said rotor being in driving connection to said camshaft, the axis of said speed-sensing device being arranged on the same side of said plane as is said pivot of said lever and in one common housing.

2. In a fuel injection pump, in combination, support means; a rotary camshaft supported for rotation about its axis by said support means and adapted to be driven by an engine supplied with fuel from the injection pump at a speed corresponding to the engine speed; fuel pump means driven by said cam shaft and including at least one piston whose axis is located in a plane in which the axis of said cam shaft is also located; rotary means carried by said support means on one side of said plane and having an axis parallel to that of said camshaft, said rotary means being driven by said cam shaft and providing a torque which is proportional to the speed of rotation of said camshaft; cam means participating in the adjustment of the stroke of the piston, said cam means being located on the side of said plane opposite from said rotary means and also having an axis parallel to that of said cam shaft, said cam means being supported for angular turning movement around its axis in said support means; and spring means cooperating with said cam means for turning the latter around its axis and operatively connected with said rotary means for opposing the torque thereof whereby when said rotary means and spring means are in equilibrium said cam means will have an angular position corresponding to the engine speed to introduce the latter factor into the setting of the stroke of the pump piston.

3. The combination of claim 2 and wherein said cam means is a three-dimensional cam and is supported for axial movement along its axis as well as for turning movement around its axis; and means operable at the will of the operator for shifting said cam means along its axis to participate in the setting of the stroke of the pump piston also according to the axial position of said cam means.

References Cited in the file of this patent

UNITED STATES PATENTS

| | | |
|---|---|---|
| 688,247 | Hoff | Dec. 3, 1901 |
| 1,319,857 | Edholm | Oct. 28, 1919 |
| 1,922,538 | Groff | Aug. 15, 1933 |
| 1,996,710 | Sass | Apr. 2, 1935 |
| 2,029,941 | Pokorney | Feb. 4, 1936 |
| 2,148,112 | Dillstrom | Feb. 21, 1939 |
| 2,183,436 | Towler et al. | Dec. 12, 1939 |
| 2,239,884 | Deeley | Apr. 29, 1941 |
| 2,254,539 | Mattox | Sept. 2, 1941 |
| 2,391,221 | Beeh | Dec. 18, 1945 |
| 2,652,041 | Knudsen | Sept. 15, 1953 |
| 2,809,595 | Adams et al. | Oct. 15, 1957 |
| 2,881,705 | Staege et al. | Apr. 14, 1959 |

FOREIGN PATENTS

| | | |
|---|---|---|
| 146,972 | Great Britain | Oct. 6, 1921 |